Feb. 27, 1962  G. A. KLATCHKO  3,022,660
NONDESTRUCTIVE TESTING APPARATUS
Filed June 6, 1960  2 Sheets-Sheet 1

INVENTOR.
GEORGE A. KLATCHKO
BY Harold W. Adams
ATTORNEY.

Feb. 27, 1962 G. A. KLATCHKO 3,022,660
NONDESTRUCTIVE TESTING APPARATUS
Filed June 6, 1960 2 Sheets-Sheet 2
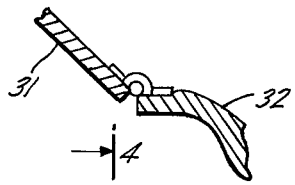
FIG. 3
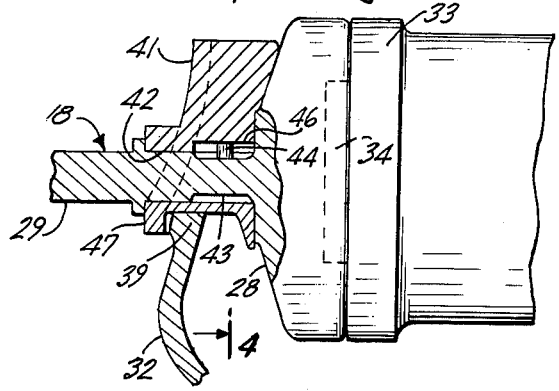
FIG. 5
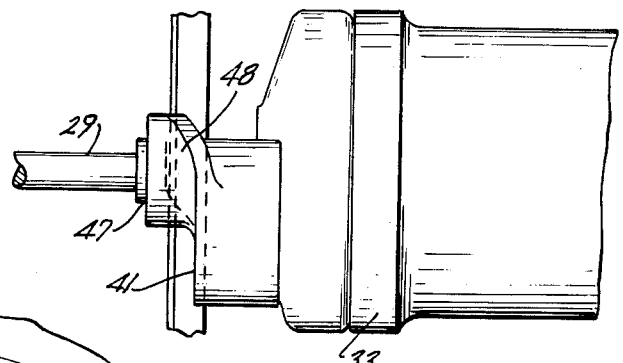
FIG. 4
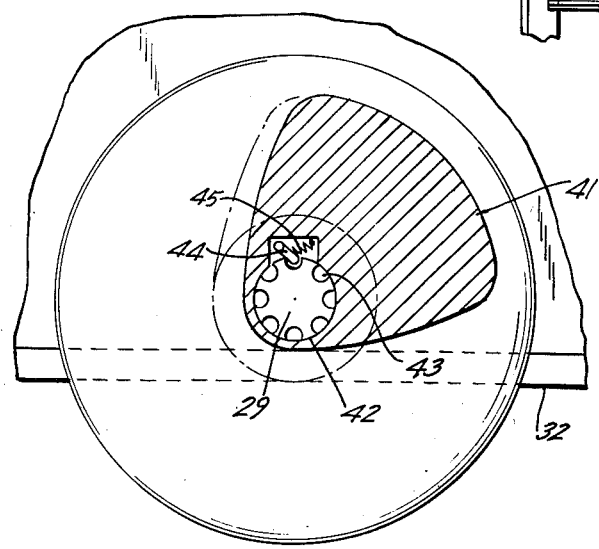
INVENTOR.
GEORGE A. KLATCHKO
BY Harold W. Adams
ATTORNEY

United States Patent Office 3,022,660
Patented Feb. 27, 1962

3,022,660
NONDESTRUCTIVE TESTING APPARATUS
George A. Klatchko, Levittown, Pa., assignor to Curtiss-Wright Corporation, a corporation of Delaware
Filed June 6, 1960, Ser. No. 34,074
8 Claims. (Cl. 73—67.8)

This invention relates to nondestructive testing apparatus and more particularly to apparatus for nondestructively testing continuously advancing articles.

It is well known that many railroad accidents result from broken railroad car axles. By inspecting the railroad car axles for cracks and defects periodically, defective axles may be detected and replaced before the axles break during operation thereby greatly reducing the number of accidents.

Accordingly, it is an object of this invention to provide apparatus for nondestructively testing articles such as the axles of railroad cars.

A further object of this invention is to provide an apparatus for ultrasonically testing rolling stock such as the axles of moving railroad cars.

Yet another object of this invention is to provide apparatus for automatically withdrawing a nondestructive test probe from a moving railroad car journal box.

Still a further object of this invention is to provide apparatus for simultaneously raising and withdrawing a nondestructive test probe from a railroad car journal box.

Apparatus for performing these and many other objects may include an ultrasonic test probe, magnetic means for coupling and uncoupling the test probe to the face of an axle to be tested while rotating within a journal box, and means for withdrawing the test probe from the journal box upon the completion of the operation.

These and many other objects will become apparent from the following description when read in view of the appended drawings in which:

FIGURE 3 is an enlarged partial sectional view of the test probe taken along the lines 3—3 of FIG. 1 showing a lobe shaped ejector cam mounted on the test probe.

FIGURE 4 is an enlarged cross sectional view taken along lines 4—4 of FIG. 3 showing a latching finger for connecting the cam to a shaft.

FIGURE 5 is a plan view of the test probe showing the cam as mounted on the test probe in greater detail and FIGURE 6 is an electrical schematic of a control circuit for the nondestructive testing apparatus.

Figure 1:
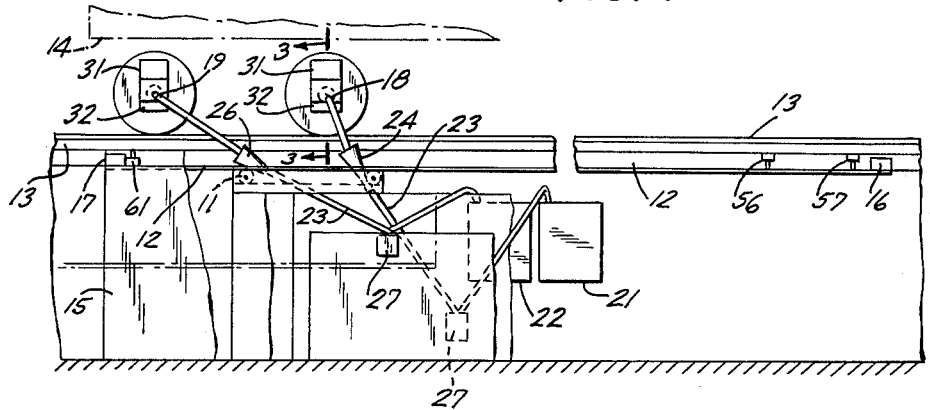
FIGURE 1 is a side elevational view of an embodiment of the invention showing a nondestructive testing apparatus for testing railroad car axles and including a motor driven carriage and portable nondestructive test probes supported thereby.

Referring now to the drawings and in particular to FIG. 1 the nondestructive testing apparatus is arranged in a preferred embodiment for testing railroad car axles for instance and comprises a motor driven carriage 11 adapted to travel on rails 12 extending parallel to a railroad track 13 over which railroad cars 14 travel. The carriage 11 travels above a suitable pit 15 or the like between stops 16 and 17 at either end of the rails 12. Two ultrasonic test probes 18 and 19 such as an Echometer Model TS602 manufactured by the Curtiss-Wright Corporation and which forms the subject matter of a copending patent application Serial No. 801,652 filed March 24, 1959 are mounted on the carriage 11.

Each test probe 18 and 19 is connected to a control cabinet 21 and 22 by a connector cable 23 which extends through guide tubes 24 and 26 mounted in a ball joint or the like so as to swivel on the carriage 11. Weights 27 suspended from the connector cables 23 maintain tension in the connector cables 23 which are held against rotation by an interlocking key and keyway or the like formed on and in the guide tubes 24 and 26 and connector cables 23 respectively. Numerous other arrangements may be employed as is well known and the key and keyway need not be shown. The key and keyway permit the connector cables 23 to slide through the guide tubes but prevent rotation of the cables with respect to the guide tubes 24 and 26.

The connecting cables 23 are encased in a steel sheath or the like of high torsional stiffness. When the connector cables 23, which are slidably gripped by the guide tube 24 and 26 are twisted along their longitudinal axis and released, they untwist with great force. The connector cables 23 complete the necessary electrical connections between the transducer test probes 18 and 19 and the respective control cabinets 21 and 22.

Figure 2:
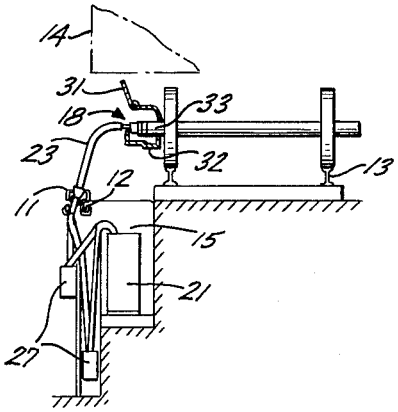
FIGURE 2 is an end view of the nondestructive testing apparatus shown in FIGURE 1 illustrating the position of the test probe with respect to the carriage and a car axle being tested within a railroad journal box shown partially in section.

Referring to FIGURES 2 and 3 the transducer test probes 18 and 19 each comprise a plurality of transducer elements spaced about the periphery of a circular head 28 affixed to a cylindrical shaft 29. An operator in utilizing the transducer test probe 18 for instance first lifts a lid 31 of a journal box 32 on the railroad car 14, an axle 33 of which it is desired to ultrasonically inspect. As the car 14 rolls by, the operator inserts one of the test probes 18 into the journal box 32 and into engagement with the end face of the rotating axle 33.

At this time an electro magnet 34 within the head 28 of the test probe 18 (FIGS. 2 and 6) is energized by the actuation of a mercury switch 37 attached to the shaft 29 of test probe 18. The switch 37 trips when the shaft of the probe 18 is horizontal and positioned on the end face of the axle 33 to magnetically couple the transducer probes 18 or 19 to the rotating car axle 33. It is to be noted that a manually operated switch may be utilized to energize the electro magnet 34.

Figure 6:
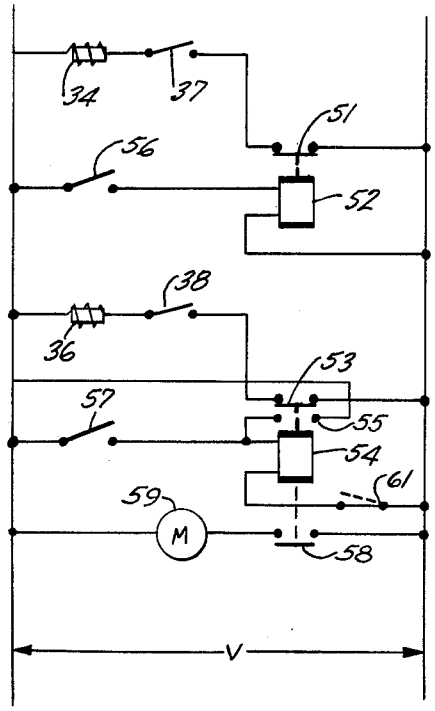

The test probe 19 is similarly equipped with an electro magnet 36 and a mercury switch 38 as shown in FIGS. 2 and 6.

When the test probes 18 and 19 are positioned a beam of ultrasonic vibrations from the transducer elements affixed to the head 28 are directed into the axles 33. Those vibrations striking a flaw such as a crack or the like and which are reflected are utilized to indicate the presence of the fault.

As shown in FIG. 2, an operator in inserting either of the test probes 18 or 19 into the journal box 32 must hold each of the test probes 18 or 19 at an angle while inserting the lower edge of the circular head 28 of the respective test probe behind a front bottom lip 39 of the journal box 32. The test probes 18 and 19 are then raised to a horizontal position into alignment with the face of an axle.

As shown in FIGURES 3, 4 and 5 a lobe cam 41 having an aperture 42 therethrough is mounted on the shaft 29 directly in back of the head 28 on each of the transducer test probes 18 and 19. A plurality of slot like grooves 43 extending parallel to the longitudinal axis of the shaft 29 are evenly spaced around the periphery of the shaft 29. The longitudinal grooves 43 receive a spring tensioned latching finger 44 secured to the lobe cam 41 in a key way 46 opening into the aperture 42. The latching finger 44, which is held in an extended position in the aperture 42 and grooves 43 by suitable means such as a compression spring 45, locks the cam 41 to the shaft 29 in one direction of rotation of the shaft 29. When the shaft rotates in an opposite direction it urges the latching finger 44 out of the grooves 43 against the compression spring and into the keyway 46, permitting the shaft to rotate free of the cam 41.

When the test probes 18 and 19 are positioned in a journal box 32, the cam 41 extends over and lies directly above the front lower lip 39 of the journal box 32. An overhanging flange 47 on the cam 41 engages the lip 39. In operation, when either of the test probes 18 or 19 is magnetically coupled to a rotating axle 33 the shaft 29 will rotate within the aperture 42 in the cam 41 which remains stationary. Accordingly, for example, rotation of the transducer test probe 18 will twist the steel sheathed connector cable 23 between the test probe 18 and the guide tube 24.

Upon a completion of the nondestructive testing operation and de-energization of the electromagnet 34 the connector cable 23 will untwist imparting a rotary motion to the transducer test probe 18 which in turn causes the lobe cam 41 to rotate because of the latching finger 44 extending into the longitudinal grooves 43. A helical groove 48 formed on the under side of the overhanging flange 47 as shown in FIG. 5 and which cradles the lower edge 39 of the journal box 32 during rotation of the cam 41 withdraws the test probe 18 from the axle 33 while simultaneously raising the test probe 18 within the journal box 32. When the test probes 18 or 19 are uncoupled and clear the journal box 32, they are retracted by the weights 27.

*Operation*

The operation of the nondestructive testing apparatus will be described in conjunction with the control circuit shown in FIGURE 6. Assuming it is desired to ultrasonically inspect the axles 33 of a railroad car 14 as it rolls past a test point, an operator will first raise the journal box lid 31, wipe the axle clean and oil the end face of the axle 33 to provide a good coupling between the axle and the test probes 18 and 19.

The operator then inserts each test probe 18 and 19 in turn into an open journal box 32, aligning it with the end face of each axle to be inspected. The test probe 18 is the leading test probe and is the first to be coupled to an axle 33. As stated when the shaft 29 of the test probe 18 is brought to the horizontal position the mercury switch 37 closes to energize the electromagnet 34 within the head 28 of the test probe 18 through normally closed contacts 51 controlled by a relay 52. The electromagnet 36 within the test probe 19 is energized through normally closed contacts 53 controlled by a relay 54 when the mercury switch 38 is brought to a horizontal position. Thus, as each test probe 18 and 19 is brought to the horizontal and aligned with an axle 33 the electromagnets 34 and 36 associated with the respective test probes 18 and 19 are energized to magnetically couple each of the test probes 18 and 19 to an axle 33.

Having coupled the test probe 18 with a rotating axle 33 the moving railroad car 14 continues to roll beyond the test point pulling the carriage 11 along the rails 12. An operator then couples the test probe 19 to an axle 33 in a similar fashion. During this time the connector cables 23 connected to the test probes 18 and 19 are twisted in a clockwise direction along their longitudinal axes. As the carriage 11 approaches the stop 16 it operates a switch 56 which energizes the relay 52 to open the contacts 51 and de-energize the electromagnet 34, uncoupling the test probe 18 from the axle 33. At that time the connector cable 23 will untwist, rotating the cam 41 against the front lower lip 39 of the journal box 32 to simultaneously raise and withdraw the test probe 18 from the journal box 32. When the test probe 18 falls free from the journal box 32 it is retracted to the carriage 11 by the weight 27 suspended from the connector cable 23.

As the test probe 19 remains coupled to an axle 33, the carriage 11 will continue to move with the car 14 until the carriage 11 trips a switch 57 to energize the relay 54 to close holding contacts 55 and open the contacts 53 to de-energize the electromagnet 36 and uncouple the test probe 19 from the axle 33. In a similar fashion the test probe 19 will be ejected from the journal box 32 and retracted to the carriage 11 by the weight 27. At the instant the switch 57 is closed and the contacts 53 are opened contacts 58 are closed to energize a motor 59 mounted on the carriage 11 and shown only in FIG. 6, to return the carriage 11 to the starting position. When the carriage 11 reaches the stop 17 it opens a switch 61 which opens the holding circuit and de-energizes the relay 54. This opens the contacts 58 to stop the motor and position the carriage for a next testing operation.

A preferred embodiment of the invention has been shown but obviously numerous alterations and modifications may be made in the light of the above teaching. Accordingly, it is to be expressly understood that the spirit and scope of the invention is to be limited only by the spirit and scope of the appended claims.

I claim:

1. In a stationary inspection station, apparatus for nondestructively testing the axles of moving railroad cars; which comprises a movable carriage, first and second nondestructive test probes for testing said axles for defects when coupled to said axles, each of said test probes including an electromagnet, cables connecting said test probes to said carriage, switching means for energizing the electromagnets and magnetically coupling each of said test probes to a rotating car axle when each of said test probes is brought into alignment therewith in a first position whereby said carriage is connected to and drawn by said moving railroad car between said first position and a second position, switching means actuated by said carrier for de-energizing each of said electromagnets to uncouple the test probes from the axles in a second position, and motor means responsive to said switching means for returning said carriage to said first position in preparation for a next testing operation.

2. Apparatus for withdrawing a test probe coupled to a rotating railroad car axle within a journal box from the journal box upon the completion of a nondestructive test and uncoupling of the test probe from the car axle which comprises a cam secured to and free to rotate with the test probe in one direction only, said cam engaging the journal box, and a flexible cable connected to the test probe at one end and rigidly secured at the other whereby the flexible cable twists during the testing operation and untwists upon the completion of the testing operation and the uncoupling of the test probe to rotate the cam against the journal box and withdraw the test probe therefrom.

3. Apparatus for nondestructively testing railroad car axles in which a nondestructive test probe is inserted into a journal box and magnetically coupled to the face of the axle so as to rotate with the axle which comprises a nondestructive test probe, a cam connected to the test probe, means for locking the cam to the test probe in one direction of rotation of the test probe and for supporting the cam free of the test probe when the test probe rotates in an opposite direction, a flexible cable connected to the test probe at one end and rigidly held at the other end and which twists as the axle and test probe coupled thereto rotates whereby upon the uncoupling of the test probe with the axle the flexible cable untwists rotating the cam to simultaneously raise and withdraw the test probe from the journal box.

4. Apparatus for nondestructively testing railroad car axles in which a nondestructive test probe is inserted into a journal box and magnetically coupled to the face of the axle so as to rotate with the axle which comprises a nondestructive test probe, a cam locked to the test probe when the test probe rotates in one direction and freely connected to the test probe when the test probe rotates in an opposite direction, a flexible cable connected to the test probe at one end and rigidly held at the other end and which twists as the axle rotates whereby upon the uncoupling of the test probe with the face of the axle the flexible cable untwists rotating the cam to simultaneously raise and withdraw the test probe from the journal box.

5. In a stationary testing station for inspecting the axles of moving railroad cars, said station having a movable carriage arranged therein and including nondestructive testing apparatus in which a pair of ultrasonic test probes secured to said movable carriage having electromagnets therein which are aligned and coupled to the ends of the rotating axles of said moving railroad car in a first position whereby said movable carriage is drawn by said railroad car between said first position and a second position, said movable carriage being uncoupled in said second position, a control system which comprises a first switching means for energizing the electromagnet of each of said ultrasonic test probes to magnetically couple the ultrasonic test probes to the axles in said first position, a second switching means actuated by the carriage for de-energizing the electromagnets to uncouple the test probes in turn from the axles to which coupled in the second position, electrical means responsive to said second switching means for energizing said motor driven carriage and returning said motor driven carriage to said first position, and third switching means actuated by said motor driven carriage for stopping said motor driven carriage at said first position.

6. In a nondestructive testing apparatus for inspecting railroad car axles and in which an operator at a starting position aligns a nondestructive test probe within a journal box with an axle to be inspected, said test probe including an electromagnet for magnetically coupling the test probe to the axle to be inspected, the improvement which comprises rails extending parallel to the path of movement of a railroad car, the axles of which are to be inspected; a stop at either end of said rails; a motor driven carriage adapted to travel on said rails between said stops; a pair of swivel mounted guide tubes secured to said carriage; first and second ultrasonic test probes including a flat circular head and a shaft extending therefrom; a control cabinet for each of said first and second ultrasonic test probes; control cables connected to said first and second ultrasonic test probes and to said control cabinets, each of said control cables passing through one of the guide tubes, said guide tubes gripping said control cables so as to allow axial movement of the control cables only; a weight connected to each of said control cables between said guide tube and said control cabinets; a mercury switch affixed to the shaft of each of said first and second ultrasonic test probes, said mercury switches arranged to energize the electromagnet of the respective test probe to which mounted to magnetically couple that test probe to a car axle when the shaft of each of said first and second test probes is raised to a horizontal position, said first ultrasonic test probe being the first to be coupled to an axle of a moving railroad car whereby said carriage is magnetically coupled to said railroad car by means of said test probe and said cable and drawn along said rails; a first electrical means actuated by said carriage for de-energizing each of the electromagnets in said first and second ultrasonic test probes; cam means secured to the shaft of each of said first and second test probes for simultaneously raising and withdrawing each of said first and second test probes from said journal box as the first and second test probes are uncoupled, the weights affixed to each of said control cables retracting said first and second ultrasonic test probes; second electrical means actuated by said first electrical means for energizing the motor driven carriage to return said carriage to the starting position; and a third electrical means actuated by said carriage for stopping said motor driven carriage in the starting position.

7. In a nondestructive test probe having a transducer head and a shaft extending therefrom, the improvement which comprises a plurality of longitudinal grooves formed about the periphery of the shaft; a cam having an aperture therethrough rotatably mounted on the shaft and over said longitudinal grooves; a spring biased latching pawl affixed to said cam and extending into the aperture therein, said latching pawl being received by the longitudinal grooves whereby the cam remains stationary in one direction of rotation of the shaft and rotates with the shaft in an opposite direction of rotation of the shaft.

8. In a stationary inspection station for inspecting railroad car axles, apparatus for nondestructively testing the axles of moving railroad cars which comprises a movable carriage; a nondestructive test probe for inspecting said axles for defects; a cable connecting said test probe to said carriage; magnetic means for coupling said test probe to an axle of said moving railroad car in a first position whereby said carriage is drawn by said railroad car between said first position and a second position, said axle being tested during said interval when said carriage is moving between said first and second positions; switching means actuated by said carrier in said second position for controlling said magnetic means to uncouple said test probe from said axle; and motor means mounted on said carriage and controlled by said switching means for returning said carriage to said first position.

References Cited in the file of this patent
FOREIGN PATENTS
739,998    Great Britain _____ Nov. 2, 1955
OTHER REFERENCES
Publication—Instruments, December 1946, article by Dice on pp. 718–722.